Sept. 5, 1967  J. J. P. BERNARD ET AL  3,339,741
APPARATUS FOR THE BIOLOGICAL PURIFICATION OF WASTE WATER
Filed June 22, 1965  2 Sheets-Sheet 1
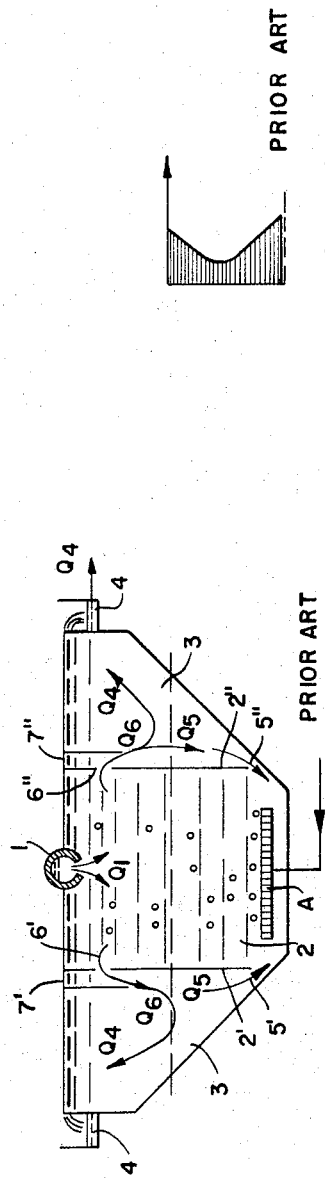
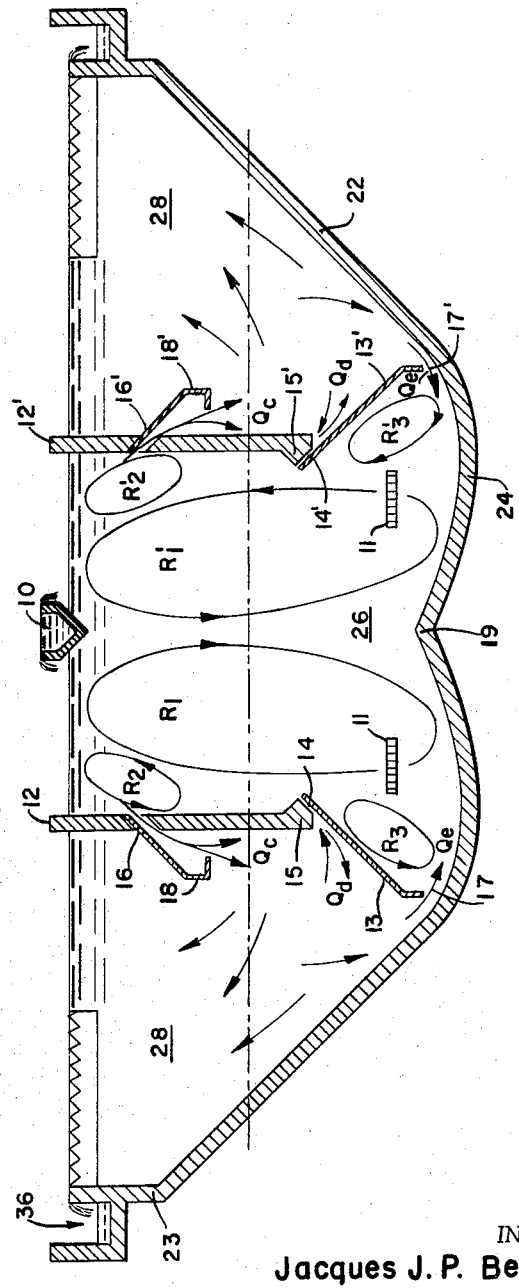
INVENTORS
Jacques J. P. Bernard &
Jean L. H. Bebin
BY Touraver and Broudy
ATTORNEYS INVENTORS
Jacques J. P. Bernard &
Jean L. H. Bebin BY Tourover and Broudy

ATTORNEYS

United States Patent Office 3,339,741
Patented Sept. 5, 1967

3,339,741
APPARATUS FOR THE BIOLOGICAL PURIFICATION OF WASTE WATER
Jacques J. P. Bernard, Port-Marly, and Jean L. H. Bebin, Franconville, France, assignors to Degremont S.A., Suresnes, France, a corporation of France
Filed June 22, 1965, Ser. No. 465,890
Claims priority, application France, Jan. 7, 1965, 1,113
5 Claims. (Cl. 210—195)

ABSTRACT OF THE DISCLOSURE

The disclosure relates to a device for use in the purification of sewage water by the activated sludge process. A centrally located aeration zone is separated from the settling zone by a wall having a vertical upper portion and an inclined lower portion. Between these two portions is located a passageway which is capable of passing liquid in both directions. The aerators are so located in the aeration zone in relation to the inclined lower portion of the dividing wall, the shape of the bottom wall of the aeration zone, and the sewage water infeed, such that a circular flow of sewage water is induced in the aeration zone which sweeps upwardly past the passageway between the upper and lower inclined portions of the dividing wall so as to induce a flow from the settling zone to the aeration zone.

---

The present invention relates to water treatment installations, and, more particularly, to the treatment of waste water or sewage water, the purification of which is achieved through an activated sludge treatment.

The general process with which the present invention is concerned consists mainly of two phases. The first phase is an aeration procedure during which the water to be treated—which is thoroughly mixed with activated sludge and contains aerobic microorganisms—is aerated in order to allow the growth of the aerobic bacteria. Through adsorption and absorption, such bacteria assure the elimination or organic matter in the water to be purified. The second or settling phase involves the separation of the activated sludge resulting from aeration from the remainder of the water. This phase provides the settling of the activated sludge from the water thereabove which is decanted therefrom.

For many years, the two phases of the operation were applied separately in two different areas. It was subsequently discovered that by combining both phases in one device, desoxygenation or loss of oxygen of the activated sludge was reduced to a minimum. Prior to combining both phases in a single device, such desoxygenation occurred in the sedimentation basin which was separated from the aeration basin. Insufficient oxygen in activated sludge is highly undesirable since it leads to a reduction in activity and in purification capacity of the aerobic baceteria and to an excessive air requirement for purification. Desoxygenation may also produce anaerobic fermentations with their resultant release of nauseating odors. The supposedly purified effluent might also carry sludge containing absorbed gases.

By sloping the side walls between the two phases present in a single device another advantage was obtained. Mechanical scraping systems and/or recirculation pumping systems to the aeration zone for the sludge deposited in the settling zone were eliminated.

Various double-phase or combined units have been proposed and generally include the following main features as illustrated in FIG. 1: a central (or, conversely, peripheral, e.g. annular) aeration zone 2 is provided into which the water to be treated is introduced through suitable means 1. Aeration is insured in most cases by blowing air into the bottom of the aeration zone through a suitable means A in order to insure a sufficient tubulence and avoid deposit of sludge which could start anaerobic fermentations. A peripheral, e.g. annular (or, conversely, central) settling or decanting zone 3 is provided adjacent the aeration zone and is separated therefrom by partition walls 2' and 2". Sludge settles to the bottom of the settling zone while purified and decanted water is collected in the upper area thereof. The walls 2' and 2" separating the settling and the aeration zones generally include openings which allow both the flow of mixed water and activated sludge from the aeration to the settling zone and the return flow of decanted sludge from the settling zone to the aeration zone.

In the past these openings have been located generally at either one or two levels. In the type of device having only one series of openings, these openings 5' and 5" are located at the lowermost portion of the partition walls in order to insure the transfer of decanted sludge to the aeration zone. This type of device has the disadvantage of allowing the water-activated sludge mixture to flow from the aeration zone to the settling zone against a current of decanted sludge moving from the settling zone to the aeration zone. This often results in the sludge being carried up in the settling zone where it resides too long under conditions of insufficient oxygen which may generate anaerobic bacteria fermentation. For this reason, devices utilizing only one series of openings are applicable only for operations in which the outflow of liquid into the settling area is low.

On the contrary, whenever the detention time of liquid in the device is desired to be low and exit speeds in the settling zone are high, it is necessary to provide two series of openings. The first openings 5' and 5", as in devices with only one series of openings, are located at the lowest portion of the partition walls, while the second openings 6' and 6" are generally located at the top of the unit. In this case, the amount of raw water to be purified $Q_1$ which is fed to the aeration zone 2 is equal to the amount of purified and decanted water $Q_4$ which exits from the upper end of the settling zone 3 and this, in turn, is equal to the amount of activated sludge-water mixture $Q_6$ which flows through the upper series of openings 6' and 6" from the aeration zone 2 to the settling zone 3 minus the quantity of decanted sludge $Q_5$ which flows back from the settling zone 3 to the aeration zone 2 through the lower series of openings 5' and 5".

While the above type of device is useful in many cases, it is often desirable to reduce the rate of oxygen depletion or desoxygenation of activated sludge in the settling or decanting zone above and beyond what is provided in such apparatus. A manner of reducing such rate of desoxygenation is to reduce the detention time of the activated sludge in the decanting zone. This can in part be accomplished by increasing the rate of flow $Q_6$ of activated sludge-water mixture through the upper opening 6' and 6" into the settling zone 3 and thereby increasing the flow rate of sludge back to the aeration zone 2 through the bottom openings 5' and 5", for a treated flow assumed to be fixed at raw input equal to purified water output. Various means are possible to accomplish this result, namely the increasing of the size of the upper openings 6' and 6". However, this is not entirely successful since there are limits related to increasing the rates of flow. Thus, too large an increase of flow $Q_6$ of water-activated sluge mixture from the aeration zone to the decanting zone through the upper openings creates turbulences in the decanting zone, thus allowing sludge in suspension to flow into the supposedly decanted water.

Furthermore, in a combined device, the oxygen carrying capacity of the sludge reaches a minimum midway during its travel to the bottom of the settling zone as illustrated in FIG. 1A. At the surface of the sludge bed the oxygen concentration of the sludge is high, because this upper layer of sludge has just passed through the upper openings 6' and 6" from the aeration zone. Similarly, the oxygen holding capacity of the sludge is also high at the very bottom of the settling zone due to the combined effects of exchanging streams through the lower openings 5' and 5" and by the injection of some air and the diffusion effects between the aeration and decanting zones through the bottom openings. On the other hand, at the midpoint of its downward travel the sludge contains very little oxygen and this is undesirable.

Another defect in the above-described equipment is that the water-activated sludge mixture flowing through the upper openings from the aeration zone to the decanting zone contains a certain amount of absorbed or occluded air which, upon release, has a tendency to cause turbulence in the decantaing zone 3. Such release of air sometimes causes the supposedly purified effluent to carry sludge therewith as it exits from the upper end of the decanting zone. It is, therefore, necessary to eliminate such air before the flow through the upper openings is directed to the dectanting zone itself.

To solve the above problems, various other devices have been proposed. Thus, baffles 7' and 7" have been installed in the decanting zone adjacent the upper openings 6' and 6" to reduce the speed of inflow therethrough into the settling area. This has the serious disadvantage of providing an air release area which takes space away from the upper part of the decanting zone thereby reducing the available decanting surface in the zone and thereby reducing the maximum flow which can be treated in the unit.

Another means utilized in an attempt to solve the above difficulties has been the placement of the air introduction means A away from the partition walls towards the center of the aeration zone. This attempted solution has the defect of inhibiting the flow $Q_5$ of sludge from the settling zone to the aeration zone in the area where air or oxygen is introduced into the aeration zone; it is preferable to return the decanted and partially desoxygenated sludge to the aeration zone in the area where the density of air is maximum and this is inhibited by the placement of these air introduction openings away from the openings 5' and 5".

It is therefore an object of the present invention to provide a new and improved manner of purifying waste or sewage water.

It is another object of the present invention to provide a new and improved combined purification unit which obviates the defects and disadvantages of the prior art, such as indicated above.

It is another object of the present invention to provide a combined unit for biological treatment, the exchange between aeration and settling zones being redistributed over three different levels wherein there is a connection between the two zones at mid-height of the sludge bed.

It is another object of the present invention to provide a water purification device wherein the net area available for decanting the purified water is increased by eliminating the air release areas at the free upper surface level of the decanting zone.

It is an other object of the present invention to provide a purification device which is simple and inexpensive to construct.

It is another object of the present invention to provide a purification device which is simple and inexpensive to operate, yet is highly effective.

These and other objects and the nature and advantages of the instant invention will be apparent from the following description taken in conjunction with the accompanying drawings, wherein:

FIGS. 1 and 1A, heretofore described, are diagrammatic views of a prior art unit;

FIG. 2 is a sectional front elevation of a device in accordance with the present invention;

Figure 3:
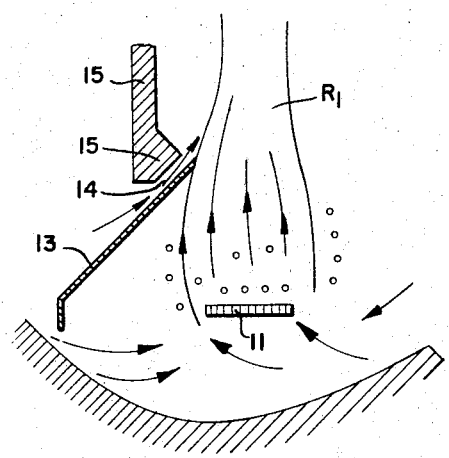
FIG. 3 is a detailed sectional view showing one flow pattern in the device of FIG. 2.

The present invention comprises a combined unit for biological treatment in which:

A flow of an activated sludge mixture, equal to or slightly higher than the nominal flow of waste or sewage water to be treated, is introduced into the upper part of the decanting zone.

The sludge transiting through the decanting zone is kept in a state of homogeneous oxygenation by an exchange between aeration and decanting zones which occurs on three different levels, approximately in the upper, the middle and the lower part of the unit.

The air-release zone for the fluid transiting from aeration to settling, is eliminated at the free surface level.

The decanted sludge is reintroduced into the aeration zone at points where air density is maximum.

The advantages of such an apparatus include:

The exchange between aeration and settling zones is redistributed over three different levels instead of two only. Moreover, there is a connection between the two zones at mid-height of the sludge bed. Such a connection will reduce the amount of flow ($Q_6$) introduced to the upper part of the equipment as compared to the same amount in unit with openings on two levels only: namely, (6' and 6")–(5' and 5").

Separation of the particles in suspension from the purified water occurs at the upper part of the decanting zone and a reduction of flow introduced into this zone will facilitate the final purification of the water.

The net area available for decanting the purified water is increased by eliminating the air-release areas at the free surface level.

Construction of the device is simplified.

Operation of the device is simplified. The hydraulic effects, resulting from variations in air and water flows, are substantially reduced due to the distribution of exchanges between aeration and decanting zones at three different levels instead of two. In the case of domestic sewage, the adjustment of openings between aeration and decanting zones may thus be eliminated.

A device for the purification of waste and sewage waters utilizing the deactivated sludge process is shown generally in FIG. 2. The device is defined by an outer wall 23, having an inclined bottom portion 22 and a curved portion 24, and a series of inner walls 12–12' and 13–13' which separate the device into a central aeration zone 26 and decanting zones 28 which may be two separate zones on either side of zone 26 or a single annular zone 28. Although described as separate walls, it will be understood that the dividing or separating walls 12–12' and 13–13' may comprise a single unitary structure.

The upper separating wall 12–12' extends vertically from the uppermost portion of the device to a point preferably about ⅔ the distance between the extreme top of the device to its extreme bottom. The upper separating wall 12–12' is provided with a series of openings 16–16' at a point preferably about half way along the height of wall 12–12'. The lower wall 13–13' is inclined, preferably at about 45°, outwardly and downwardly from its top to its bottom towards the decanting zone 28. Due to its inclined position, the lower wall 13–13' takes up the vertical length of the device from a position about ⅔ of the distance from the top of the device to about ⅚ of the distance from the top of the device.

The vertical partition wall 12–12' is provided with an enlarged portion 15–15' at its bottom adjacent the top of the inclined wall 13–13', which extends slightly into the aeration zone 26. Disposed between the upper wall section 12–12' and the lower inclined wall section 13–13' is a second space or gap forming a passageway 14, although the second passageway 14–14' may also take the form of a series of spaced openings similar to the openings 16–16'. A third passageway 17–17' is provided between the lowermost portion of the lower wall 13–13' and the inclined bottom portion 22 of the outer wall 23. While the third passageway 17–17' is preferably a space or gap, it may also be in the form of a series of spaced openings.

The bottom portion 22 of the outer wall 23 is inclined downwardly across the entire length of the settling zone 28 towards the aeration zone 26 and is also inclined across a small portion of the aeration zone 26 towards its central axis defined by a central point or ridge 19 and this provides a flow deflecting surface extending from the ridge or point 19. This insures that the settling sludge at the bottom of the decanting zone 28 will flow downwardly into the aeration zone through the third passageway 17–17'.

The device is also provided with a suitable means to withdraw purified water from the upper portion of the decanting zone 28 and this may take the form of a simple overflow over the outer wall 23 as shown at 36. Any suitable means 10 such as a pipe or trough may be provided for introducing the raw waste or sewage into the upper portion of the aeration zone 26. The water introducing or inlet means 10 illustrated is provided with suitable flow deflecting surfaces.

Suitable air introduction means such as air ramps or distributing headers 11–11' are provided in the lower portion of the aeration zone 26 relatively close to the third annular passageway 17–17' to reoxygenate decanted sludge returning to the aeration zone.

The combined unit thus provides a flow of aerated fluid (water and activated sludge) through the openings 16–16' equal to or slightly higher than the nominal flow of raw water to be treated entering the aeration chamber 26 from the sewage feeding means 10, the slight excess, if any, being due to a small amount of recirculation. The sludge passing through the decanting zone 28 is kept in a state of homogenous oxygenation by an exchange between the aeration and decanting zones which occurs at three separate levels through the openings 16–16', 14–14' and 17–17' at approximately the upper, the middle and the lower bed of the decanted sludge. In addition, as indicated above, the air release zone for catching air bubbles as the fluid passes from the aeration zone 26 to the settling zone 28 through the openings 16–16' is eliminated at the free surface level of the sludge. Furthermore, the decanted sludge is reintroduced into the aeration zone 26 from the decanting zone 28 at points, i.e., through openings 17–17' or openings 14–14' and 17–17', where air density is at a maximum.

The device operates as follows:

The waste or sewage water to be treated is introduced into the aeration zone 26 through a channel or pipe 10. The air or oxygen supply is introduced in the vicinity of the bottom of the aeration zone through the air distribution ramps 11. The air release distribution ramps 11 are located in the immediate vicinity of the openings 17–17' so that the decanted sludge, which freely flows $Q_e$ into the aeration zone 26 through the openings 17–17', is again oxygenated immediately.

The introduction of air through the ramps 11 causes the formation of two main symmetrical whirls or movements of liquid $R_1$ and $R'_1$. Due to the deflecting effect of the lower inclined wall 13–13', two secondary whirls or circulations $R_2$ and $R'_2$ are also created which cause the aerated liquid to flow $Q_c$ through the openings 16–16' from the aeration zone 26 to the decanting zone 28. Another set of secondary whirls or circulations $R_3$ and $R'_3$ are formed beneath the lower wall 13–13' and effect the movement $Q_e$ of sludge from the decanting zone 28 through the openings 17–17' to the aeration zone 26.

The openings 14–14' are also below the level of the decanted sludge bed and material may flow $Q_d$ through the openings 14–14' between the aeration and decanting zones. The flow through the openings 14–14' may move in either direction depending upon the intensity of flow of the aeration zone.

As shown in FIG. 3, sludge flows from the decanting zone 28 to the aeration zone 26 through the opening 14–14' faster than aerated liquid flows in the opposite direction with the resultant net flow being out of the decanting zone, and this occurs when the whirls $R_1$–$R'_1$ are intensive. Thus when the whirls $R_2$ are confined to the upper half of the unit and the whirls $R_1$ are relatively intensive, as shown in FIG. 3, the openings 14–14' work as ejectors and the net direction of current through these openings is from the decanting zone 28 to the aeration zone 26.

Figure 4:
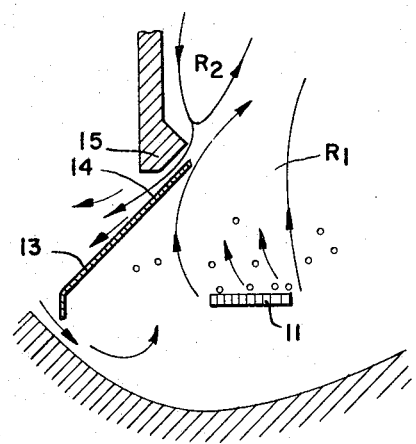
FIG. 4 is a sectional view similar to FIG. 3 showing another flow pattern.

However, as the intensity of the whirls $R_1$ causes the liquid to move up from the bottom along the walls 13–13' and in the vicinity of the openings 14–14', the whirls $R_2$–$R'_2$ gradually become intensified and then move down towards the openings 14–14'. This causes the current crossing these openings to change directions with the result that part of the flow encompassed by the whirls $R_2$–$R'_2$ moves towards the decanting zone 28 to effect the flow shown in FIG. 4. The whirls $R_2$–$R'_2$ then begin to fade due to their own intensity and the flow diagram again reverts to that shown in FIG. 3.

Figure 5:
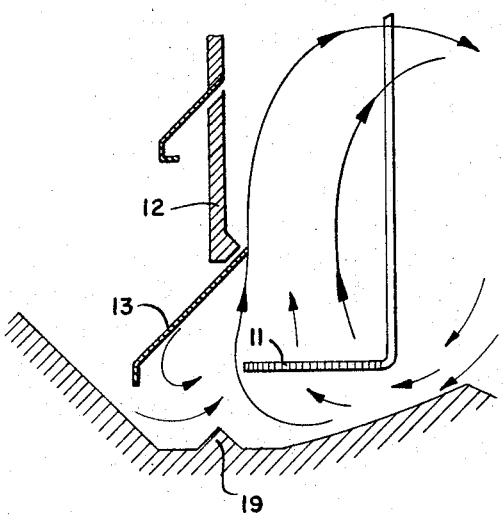
FIG. 5 is another view similar to FIG. 3 showing another embodiment.

Operation of the device thereby causes the openings 14–14' to successively pass material first in one direction and then in the other direction, thus maintaining a high oxygen concentration within the sludge bed in the decanting zone 28. Simultaneously, flow $Q_c$ through the openings 16–16' to the decanting zone is reduced. Even excessive exchanges of flow through the openings 14–14' may be tolerated because the openings 14–14' occur at a zone where the sludge is already decanted rather than in a zone of suspension as with the upper openings 16–16'.

Where water having a high degree of pollution is fed to the aeration zone 26, the required amount of air for purification purposes must be increased. In such a case, the curved bottom wall 24 adjacent the inclined bottom wall 22 would be eliminated and the entire bottom wall would be inclined as shown in FIG. 5 to avoid a high turbulence in the bottom of the decanting zone.

Figure 6:
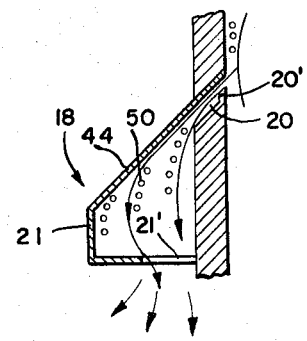
FIG. 6 is another detailed sectional view of the device of FIG. 2 showing a particular flow pattern.

Projecting into the settling zone 28 and forming an air-release trap for the passage 16–16', inclined channel members 18–18' extend from the wall 12–12', the elements 18–18' extending into the decanting zone immediately adjacent the spaced openings 16–16'. The elements 18–18' prevent the deposition of air bubbles in the decanting zone from the mixed water-activated sludge passing through the openings 16–16' and this is accomplished without reducing the free surface level above the decanting zone. The channels 18, as shown in FIG. 6, comprise a top wall 44 inclined at a 45° angle and connected to an L-shaped portion 21. Such structure provides an obstruction both to the inlet 20 of the element 18 through holes 16–16' due to the extension 20' and through the outlet 21' from the element 18 and this reduces the velocity of flow $Q_c$. The form of the element 18 permits a reduction in flow velocity through the passageway 16–16' into the decanting zone 28 as well as a reduction in the air release velocity which flows back to the aeration zone 26 since the fluid is deviated towards the vertical in escaping through the opening 21'. The shape of the channel element 18 permits trapping of air bubbles 50 below the inclined top wall 44 and their return to the aeration zone and this prevents the bubbles from entering the decanting zone where they may cause turbulence.

The passageway 14–14' existing between the vertical wall 12–12' and the inclined wall 13–13' is inclined with the upper part of the wall 13–13' extending into the aeration zone 26 sufficiently to allow the release of air carried to the aeration zone. This is due to the downward deviation imposed to the fluid entering the decanting zone through the openings 20 and 21'.

The present invention provides a number of advantages over the devices of the prior art. In the present device, the exchange between the aeration and settling zones is redistributed over three different levels instead of two only. Moreover, there is a connection between the two zones at mid-height of the sludge bed through the passageway 14–14'. Such a connection advantageously reduces the amount of flow through the upper passageway 16–16' as compared to a unit having only two levels of openings. Such reduction in flow is mainly due to equal homogeneous conditions existing at the center of the sludge bed. Separation of the particles in suspension from the purified water occurs at the upper part of the decanting zone and the resultant reduction of flow introduced in this area through the openings 16–16' facilitate the final purification of the water.

In addition, the construction of the air-release channel element 18–18' provides effective air release without reducing the free surface level above the decanting zone. The proper provision of the passageways and the sloping walls reduces the hydraulic effects resulting from variations in air and water flows; this is primarily due to the distribution of exchanges between the aeration and decanting zones at three different levels instead of two levels.

It will be obvious to those skilled in the art that various changes may be made without departing from the spirit of the invention and therefore the invention is not limited to what is shown in the drawings and described in the specification, but only as indicated in the appended claims.

What is claimed is:

1. A device for the purification of waste and sewage waters utilizing the activated sludge process, comprising:
    a decanting zone;
    an aeration zone located centrally with respect to said decanting zone;
    bottom wall means for said aeration zone having ridge means including a flow deflecting surface;
    means to introduce water to be purified into the central portion of the upper portion of said aeration zone, and including flow deflecting surfaces;
    means to withdraw purified water from the upper portion of said decanting zone;
    wall means separating said aeration zone from said decanting zone, said wall means comprising a vertical upper section and an inclined lower section, said lower section being inclined outwardly and downwardly from its top to its bottom towards said decanting zone;
    first passageway means for flow of liquid from said aeration zone to said decanting zone through said upper wall section;
    second passageway means between the lower portion of said upper wall section and the upper portion of said lower wall section;
    third passageway means for flow of sludge from said decanting zone to said aeration zone below the lower portion of said lower wall section; and
    means disposed within said aeration zone adjacent said third passageway for introducing air into said aeration zone, said air introducing means being disposed between said inclined lower wall means and said ridge means and between the said water introducing means and said ridge means, whereby flow of water is induced upwardly past said second passageway to effect flow of water through said second passageway from said decanting zone to said aeration zone.

2. A device in accordance with claim 1 wherein said first passageway is disposed about ⅓ of the distance from the top of said device to its bottom, wherein said second passageway is disposed about ⅔ of said last mentioned distance, and wherein said third passageway is disposed about ⅚ of said last mentioned distance.

3. A device in accordance with claim 1 comprising a bottom wall inclined in a direction opposite to the inclination of said lower wall section, said inclined bottom wall extending across said decanting zone and a portion of the length of said aeration zone.

4. A device in accordance with claim 1 wherein the upper portion of said lower wall section extends into said aeration zone.

5. A device in accordance with claim 1 further comprising air release zone means extending into said decanting zone from said upper wall section adjacent said first passageway means.

References Cited

UNITED STATES PATENTS 3,152,071 10/1964 Kraft _____ 210—197
3,224,964 12/1965 Derenk et al. _____ 210—221

FOREIGN PATENTS 941,857 11/1963 Great Britain.
349,552 11/1960 Switzerland.

REUBEN FRIEDMAN, *Primary Examiner.*

J. L. DeCESARE, *Assistant Examiner.*